3,103,529
PHENAZASILINES AND PREPARATION
THEREOF
Christ Tamborski, Dayton, Ohio, and Henry Gilman, Ames, Iowa; said Gilman assignor of one-half to the United States of America as represented by the Secretary of the Air Force
No Drawing. Filed Sept. 9, 1960, Ser. No. 55,102
10 Claims. (Cl. 260—448.2)

This application is a continuation-in-part of our co-pending application, Serial No. 770,900, filed October 30, 1958, now abandoned.

This invention relates to silicon-containing heterocycles. It is more particularly concerned with such heterocycles as are useful as antioxidants.

It is the primary object of this invention to provide a chemical species which will function as an improved oxidation inhibitor. Specifically, it is an object of this invention to provide silicon-containing heterocycles which are capable of materially and unexpectedly increasing the oxidative stability of high temperature fluids, resins, elastomers and greases.

According to the invention, the class of compounds which possesses the desirable qualities are the silicon-containing heterocycles having the structural formula of:

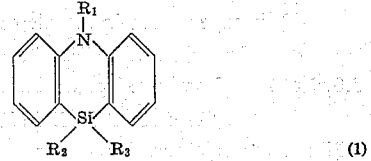

(1)

wherein $R_1$ is either hydrogen or a lower alkyl radical containing from 1 to 8 carbon atoms, $R_2$ is a lower alkyl radical containing from 1 to 8 carbon atoms, a monocyclic aryl radical containing from 6 to 12 carbon atoms or a monocyclic aralkyl radical containing from 7 to 12 carbon atoms, and $R_3$ is a monocyclic aryl radical containing from 6 to 12 carbon atoms, or a monocyclic aralkyl radical containing from 7 to 12 carbon atoms.

The silicon-containing heterocyclic compounds of this invention are produced by heating at reflux temperatures, with or without a suitable catalyst such as copper, a mixture of a disubstituted silane, having the structural formula:

(2)

and a sulfur-containing heterocyclic compound having the structural formula:

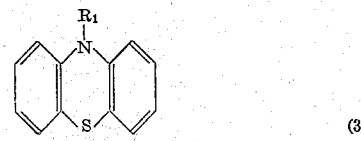

(3)

in which the radicals $R_1$, $R_2$, and $R_3$ are as previously defined.

The invention will be more fully understood by reference to the examples which follow. These examples, however, are given for the purpose of illustration only and are not to be construed as limiting the scope of the present invention in any way.

Example 1

An equimolar mixture of diphenylsilane and 10-ethylphenothiazine are heated together at reflux temperatures of from 240° C. to 255° C. for a period of 7 days, at which time the evolution of hydrogen sulfide ceases. The reaction mixture is worked up by distillation under reduced pressure. The first fraction boils at 60–115° C. at 5 mm., and the second fraction boils at 185–195° C. at 5 mm. The pressure is then reduced to 0.01 mm., and a third fraction boiling at 200–270° C. is collected, dissolved in hot petroleum ether (B.P. 60–70° C.) and chromatographed on alumina. Elution with petroleum ether yields an oil which gradually crystallizes. Recrystallization from petroleum ether gives a 6.6% yield of 5-ethyl-10,10-diphenylphenazasiline, M.P. 122–123° C.

*Analysis.*—Calculated for $C_{26}H_{23}NSi$: C, 82.74; H, 6.14; N, 3.71; Si, 7.41. The actual values found were: C, 82.35; H, 6.03; N, 4.39; Si, 7.48.

Example 2

An equimolar mixture of diphenylsilane and phenothiazine was refluxed for 3 days and worked up in the same manner as the mixture of Example 1. The reaction product gave a 1.2 percent yield of 10,10-diphenylphenazasiline, M.P. 197–198° C.

*Analysis.*—Calculated for $C_{24}H_{19}NSi$: C, 82.49; H, 5.48; Si, 8.03; N, 4.01. The actual values found were: C, 82.08, 82.27; H, 5.28, 5.23; Si, 8.10; N, 4.04, 3.89.

Example 3

The reaction of Example 2 was rerun in the presence of one mole of copper catalyst per mole of diphenylsilane. Although no pronounced improvement was noted, a slight increase in yield was produced. It is to be understood that moles of the catalyst are measured in terms of 1 mole providing 1 unit atom, or 1 gram atom, of catalyst.

Example 4

An equimolar mixture of diphenylsilane and 10-methylphenothiazine was heated and worked up in the same manner as set forth in Example 1. The reaction product so produced was 5-methyl-10,10-diphenylphenazasiline.

Example 5

An equimolar mixture of 10-ethylphenothiazine and di-p-tolylsilane is refluxed and worked up in the manner set forth in Example 1, yielding 5-ethyl-10,10-di-p-tolylphenazasiline.

Example 6

An equimolar mixture of 10-ethylphenothiazine and di-p-diphenylylsilane is refluxed and worked up in the manner set forth in Example 1, yielding 5-ethyl-10,10-di-p-diphenylylphenazasiline.

Example 7

An equimolar mixture of 10-ethylphenothiazine and methylphenylsilane is refluxed and worked up as described in Example 1, yielding 5-ethyl-10-methyl-10-phenylphenazasiline.

All of the reactions of our invention are carried out at reflux temperature, and proceed for a period of from about 3–7 days. The reactions come to completion upon the cessation of the evolution of hydrogen sulfide.

The novel heterocyclic silicon-containing compounds of this invention have proved to be of unexpected value in increasing the oxidative stability of high temperature lubricants. Oxidative stability has been increased by as much as two-fold over the stability achieved by other known antioxidant additives. These novel antioxidants are found to be of particular importance when employed as additives for lubricants which encounter the high temperature operating conditions of modern day high-speed aircraft and missiles.

Although the present invention has been described with reference to specific embodiments thereof, the invention is not to be considered as limited thereto, but includes within its scope such modifications, alterations, and variations as come within the spirit of the appended claims.

What we claim is:

1. A silicon-containing heterocyclic compound having the structural formula:

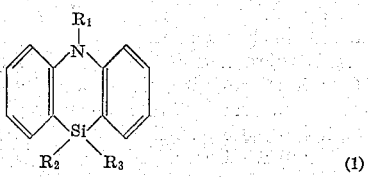

where $R_1$ is selected from the group consisting of hydrogen and lower alkyl radicals containing from 1 to 8 carbon atoms, $R_2$ is selected from the group consisting of lower alkyl radicals containing from 1 to 8 carbon atoms and monocyclic aryl radicals containing from 6 to 12 carbon atoms, and $R_3$ is selected from the group consisting of monocyclic aryl radicals containing from 6 to 12 carbon atoms.

2. As a new compound, 5-methyl-10,10-diphenylphenazasiline.

3. As a new compound, 5-ethyl-10,10-diphenylphenazasiline.

4. As a new compound, 10,10-diphenylphenazasiline.

5. A process for the production of silicon-containing heterocyclic compounds which comprises the steps of (1) heating at reflux temperature an equimolar mixture of (a) a disubstituted silane having the structural formula:

and (b) a sulfur-containing heterocyclic compound having the structural formula:

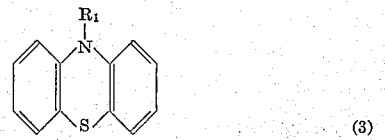

where $R_1$ is selected from the group consisting of hydrogen and lower alkyl radicals containing from 1 to 8 carbon atoms, $R_2$ is selected from the group consisting of lower alkyl radicals containing from 1 to 8 carbon atoms and monocyclic aryl radicals containing from 6 to 12 carbon atoms, and $R_3$ is selected from the group consisting of monocyclic aryl radicals containing from 6 to 12 carbon atoms, in order to effectuate a reaction therebetween, and (2) completing said reaction by continuing said heating for a period of time until the liberation of hydrogen sulfide is essentially complete.

6. A process in accordance with claim 5 wherein said disubstituted silane is diphenylsilane.

7. A process in accordance with claim 5 wherein said sulfur-containing heterocyclic compound is phenothiazine.

8. A process in accordance with claim 5 wherein said sulfur-containing heterocyclic compound is 10-methylphenothiazine.

9. A process in accordance with claim 5 wherein said sulfur-containing heterocyclic compound is 10-ethylphenothiazine.

10. A process in accordance with claim 5 wherein said period of time is about 3 to 7 days.

References Cited in the file of this patent

UNITED STATES PATENTS 3,079,414     Tamborski et al. _____ Feb. 26, 1963

OTHER REFERENCES

Gilman et al.: "Jour. Am. Chem. Soc.," vol. 79 (Dec. 5, 1957), p. 6339–40 (260–448.2n).

Wittenberg et al.: ibid, vol. 80 (Oct. 20, 1958), p. 5418–22 (260–448.2n).